United States Patent
Zhang (10) Patent No.: US 12,464,336 B2
(45) Date of Patent: Nov. 4, 2025

(54) DUAL SIM COMMUNICATION METHOD AND APPARATUS FOR TERMINAL, DEVICE, AND STORAGE MEDIUM

(71) Applicant: VIVO MOBILE COMMUNICATION CO., LTD., Dongguan (CN)

(72) Inventor: Sha Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 328 days.

(21) Appl. No.: 18/227,300

(22) Filed: Jul. 27, 2023

(65) Prior Publication Data
US 2023/0370833 A1 Nov. 16, 2023

Related U.S. Application Data

(63) Continuation of application No. PCT/CN2022/073787, filed on Jan. 25, 2022.

(30) Foreign Application Priority Data

Jan. 28, 2021 (CN) .......................... 202110123420.9

(51) Int. Cl.
*H04W 8/18* (2009.01)
*H04B 7/0404* (2017.01)
(Continued)

(52) U.S. Cl.
CPC .......... *H04W 8/183* (2013.01); *H04B 7/0404* (2013.01); *H04W 72/23* (2023.01); *H04W 88/06* (2013.01)

(58) Field of Classification Search
None
See application file for complete search history.

(56) References Cited

U.S. PATENT DOCUMENTS

| 6,724,372 B1 | 4/2004 | Bi et al. |
| 2005/0279826 A1 | 12/2005 | Merrien |

(Continued)

FOREIGN PATENT DOCUMENTS

| CN | 101247596 A | 8/2008 |
| CN | 101621864 A | 1/2010 |

(Continued)

OTHER PUBLICATIONS

First Office Action issued in related Chinese Application No. 202210915137.4, mailed Dec. 7, 2023, 7 pages.

(Continued)

*Primary Examiner* — Rebecca E Song
*Assistant Examiner* — Mohammed Niamul Huda Khan
(74) *Attorney, Agent, or Firm* — IPX PLLC (57) ABSTRACT

A dual Subscriber Identity Module (SIM) communication method and apparatus for a terminal, a device, and a storage medium are provided. The method includes: determining whether slots of dual SIM cards are aligned. The method further includes when the slots of the dual SIM cards are not aligned, within an uplink slot of a second SIM card, controlling the second SIM card to transmit a signal by using a main antenna; for an odd-numbered downlink slot of the second SIM card, controlling the second SIM card to receive a signal by using a diversity antenna within the entire odd-numbered downlink slot, and controlling a first SIM card to transmit a signal by using the main antenna in a preceding time period within the odd-numbered downlink slot and to receive a signal by using the main antenna in a later time period within the odd-numbered downlink slot.

20 Claims, 8 Drawing Sheets

(51) Int. Cl.
*H04W 72/23* (2023.01)
*H04W 88/06* (2009.01)

(56) References Cited

U.S. PATENT DOCUMENTS

| | | |
|---|---|---|
| 2010/0040011 A1 | 2/2010 | Kang et al. |
| 2012/0057525 A1 | 3/2012 | Hou et al. |
| 2012/0108273 A1 | 5/2012 | Lee et al. |
| 2015/0117415 A1 | 4/2015 | Rabe et al. |
| 2016/0134317 A1* | 5/2016 | Hu ................... H04W 68/02 455/558 |
| 2016/0277174 A1* | 9/2016 | Burnic ............... H04B 1/3816 |
| 2018/0368098 A1* | 12/2018 | Gopal .................. H04W 4/50 |
| 2022/0232367 A1* | 7/2022 | Gopal .................. H04W 52/52 |

FOREIGN PATENT DOCUMENTS

| | | |
|---|---|---|
| CN | 101951287 A | 1/2011 |
| CN | 103368622 A | 10/2013 |
| CN | 104995989 A | 10/2015 |
| CN | 106100688 A | 11/2016 |
| CN | 107079420 A | 8/2017 |
| CN | 107872881 A | 4/2018 |
| CN | 108242991 A | 7/2018 |
| CN | 109104219 A | 12/2018 |
| CN | 110166074 A | 8/2019 |
| CN | 110299927 A | 10/2019 |
| CN | 111108701 A | 5/2020 |
| CN | 111294986 A | 6/2020 |
| CN | 111866849 A | 10/2020 |
| CN | 112119649 A | 12/2020 |
| CN | 112910491 A | 6/2021 |
| EP | 2043395 A1 | 4/2009 |
| EP | 2915405 B1 | 10/2020 |
| JP | 2003187202 A | 7/2003 |
| KR | 20100021963 A | 2/2010 |
| KR | 20110071290 A | 6/2011 |
| KR | 20120099582 A | 9/2012 |
| WO | 2013167011 A2 | 11/2013 |
| WO | 2015138259 A1 | 9/2015 |
| WO | 2016053537 A1 | 4/2016 |
| WO | 2016124039 A1 | 8/2016 |
| WO | 2020103089 A1 | 5/2020 |

OTHER PUBLICATIONS

Second Office Action issued in related Chinese Application No. 202210915137.4, mailed Apr. 30, 2024, 6 pages.
Extended European Search Report issued in related European Application No. 22745225.7, mailed Jun. 17, 2024, 5 pages.
Liu Zhimin et al, "Channel Modeling and Networking Simulation of Full Duplex Communication", Journal of System Simulation, May 2018.
International Search Report issued in corresponding International Application No. PCT/CN2022/073787, mailed Apr. 1, 2022, 6 pages.
First Office Action issued in related Chinese Application No. 202110123420.9, mailed Jan. 25, 2022, 8 pages.
Zhao et al, "Study on the mastercard suspending slave card in dual card dual standby terminal", Journal of Guizhou Education University, Sep. 2016, 6 pages.

* cited by examiner

DUAL SIM COMMUNICATION METHOD AND APPARATUS FOR TERMINAL, DEVICE, AND STORAGE MEDIUM

CROSS-REFERENCE TO RELATED APPLICATIONS

The present application is a continuation of International Application No PCT/CN2022/073787, filed on Jan. 25, 2022, which claims priority to Chinese Patent Application No. 202110123420.9, filed on Jan. 28, 2021. The entire contents of each of the above-referenced applications are expressly incorporated herein by reference.

TECHNICAL FIELD

This application pertains to the field of communication technologies, and in particular, to a dual Subscriber Identity Module (SIM) communication method for a terminal, a dual SIM communication apparatus for a terminal, an electronic device, and a readable storage medium.

BACKGROUND

At present, a dual SIM design has become a routine setting for mobile phones. Existing dual SIM designs are classified into two types: dual SIM dual standby and dual SIM dual active. Dual SIM dual active means that two SIM cards are not only standby at the same time, but also can perform service transmission at the same time. For example, a user may watch an online video by using SIM2 while making a call through SIM1 by using a dual SIM dual active function. To implement dual SIM dual active, strictly speaking, two hardware radio frequency circuits are required. The SIM1 and the SIM2 implement simultaneous paging and service transmission through different hardware radio frequency circuits.

Figure 1:
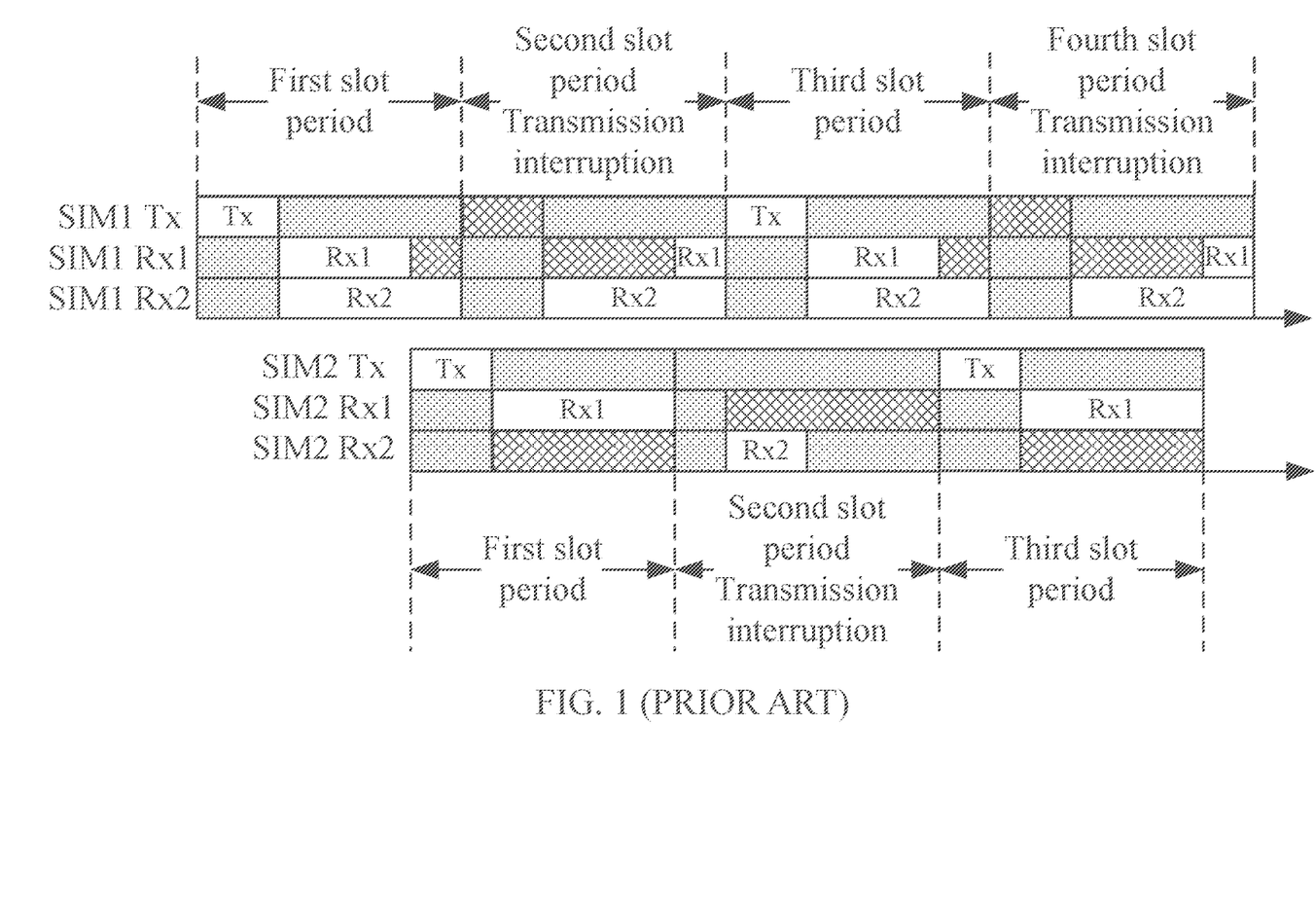
FIG. 1 is a schematic diagram of a communication process corresponding to an existing virtual dual SIM dual active technology.

To simplify a hardware architecture of dual SIM dual active, a virtual dual SIM dual active technology is proposed, that is, partial access of the SIM1 and the SIM2 is performed in a time division manner. For example, both the SIM1 and the SIM2 communicate in a Time Division Duplexing (TDD) manner. A communication process corresponding to the virtual dual SIM dual active technology is shown in FIG. 1 (a blank area in FIG. 1 indicates that a corresponding antenna is in a working state, a shadow part indicates that a corresponding antenna is in an inactive state, and a grid area indicates that a corresponding antenna is in an occupied state). However, it may be learned from FIG. 1 that, in some slot periods of the SIM1 and the SIM2, transmission is completely interrupted, and communication quality is greatly reduced.

SUMMARY

Embodiments of this application aim to provide a dual SIM communication method for a terminal.

This application is implemented as follows:

According to a first aspect, an embodiment of this application provides a dual SIM communication method for a terminal, where dual SIM cards share a main antenna and a diversity antenna, the dual SIM cards include a first SIM card and a second SIM card, and the method includes:

determining whether slots of the dual SIM cards are aligned; and in a case that the slots of the dual SIM cards are not aligned, controlling the first SIM card and the second SIM card to communicate in a first manner, where the controlling the first SIM card and the second SIM card to communicate in a first manner includes:

within an uplink slot of the second SIM card, controlling the second SIM card to transmit a signal by using the main antenna;

for an odd-numbered downlink slot of the second SIM card, controlling the second SIM card to receive a signal by using the diversity antenna within the entire odd-numbered downlink slot, and controlling the first SIM card to transmit a signal by using the main antenna in a preceding time period within the odd-numbered downlink slot and to receive a signal by using the main antenna in a later time period within the odd-numbered downlink slot; and for an even-numbered downlink slot of the second SIM card, in a preceding time period within the even-numbered downlink slot, controlling the second SIM card to receive a signal by using the diversity antenna and controlling the first SIM card to transmit a signal by using the main antenna, and in a later time period within the even-numbered downlink slot, controlling the first SIM card to receive a signal by using the main antenna, where the uplink slot of the second SIM card and a downlink slot of the second SIM card are alternated.

According to a second aspect, an embodiment of this application provides a dual SIM communication apparatus for a terminal, where dual SIM cards share a main antenna and a diversity antenna, the dual SIM cards include a first SIM card and a second SIM card, and the apparatus includes:

a determining module, configured to determine whether current slots of the dual SIM cards of the terminal are aligned; and a first control module, configured to: in a case that the slots of the dual SIM cards are not aligned, control the first SIM card and the second SIM card to communicate in a first manner, where the controlling the first SIM card and the second SIM card to communicate in a first manner includes: within an uplink slot of the second SIM card, controlling the second SIM card to transmit a signal by using the main antenna;

for an odd-numbered downlink slot of the second SIM card, controlling the second SIM card to receive a signal by using the diversity antenna within the entire odd-numbered downlink slot, and controlling the first SIM card to transmit a signal by using the main antenna in a preceding time period within the odd-numbered downlink slot and to receive a signal by using the main antenna in a later time period within the odd-numbered downlink slot; and for an even-numbered downlink slot of the second SIM card, in a preceding time period within the even-numbered downlink slot, controlling the second SIM card to receive a signal by using the diversity antenna and controlling the first SIM card to transmit a signal by using the main antenna, and in a later time period within the even-numbered downlink slot, controlling the first SIM card to receive a signal by using the main antenna, where the uplink slot of the second SIM card and a downlink slot of the second SIM card are alternated.

According to a third aspect, an embodiment of this application provides a terminal. The terminal includes a processor, a memory, and a program or an instruction that is stored in the memory and that can be run on the processor, where when the program or the instruction is executed by the processor, the steps of the method in the first aspect are implemented.

According to a fourth aspect, an embodiment of this application provides a readable storage medium. The readable storage medium stores a program or an instruction, and when the program or the instruction is executed by a processor, the steps of the method in the first aspect are implemented.

According to a fifth aspect, an embodiment of this application provides a chip. The chip includes a processor and a communications interface, the communications interface is coupled to the processor, and the processor is configured to run a program or an instruction to implement the method in the first aspect.

In the embodiments of this application, it is determined whether current slots of dual SIM cards of a terminal are aligned; and in a case that the slots of the dual SIM cards are not aligned, communication is performed in a first manner, where within an uplink slot of a second SIM card, the second SIM card is controlled to transmit a signal by using a main antenna; for an odd-numbered downlink slot of the second SIM card, the second SIM card is controlled to receive a signal by using a diversity antenna within the entire downlink slot, and a first SIM card is controlled to transmit a signal by using the main antenna in a preceding time period within the downlink slot and to receive a signal by using the main antenna in a later time period within the downlink slot; and for an even-numbered downlink slot of the second SIM card, in a preceding time period within the downlink slot, the second SIM card is controlled to receive a signal by using the diversity antenna and the first SIM card is controlled to transmit a signal by using the main antenna, and in a later time period within the downlink slot, the first SIM card is controlled to receive a signal by using the main antenna, where the uplink slot of the second SIM card and a downlink slot of the second SIM card are alternated. In this way, for either the first SIM card or the second SIM card, a signal may be transmitted in each slot period. This avoids transmission interruption between the first SIM card and the second SIM card, thereby greatly improving communication qualit.

DETAILED DESCRIPTION

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a dual SIM communication method and apparatus for a terminal, a device, and a storage medium provided in the embodiments of this application are described in detail by using embodiments and application scenes.

Figure 2:
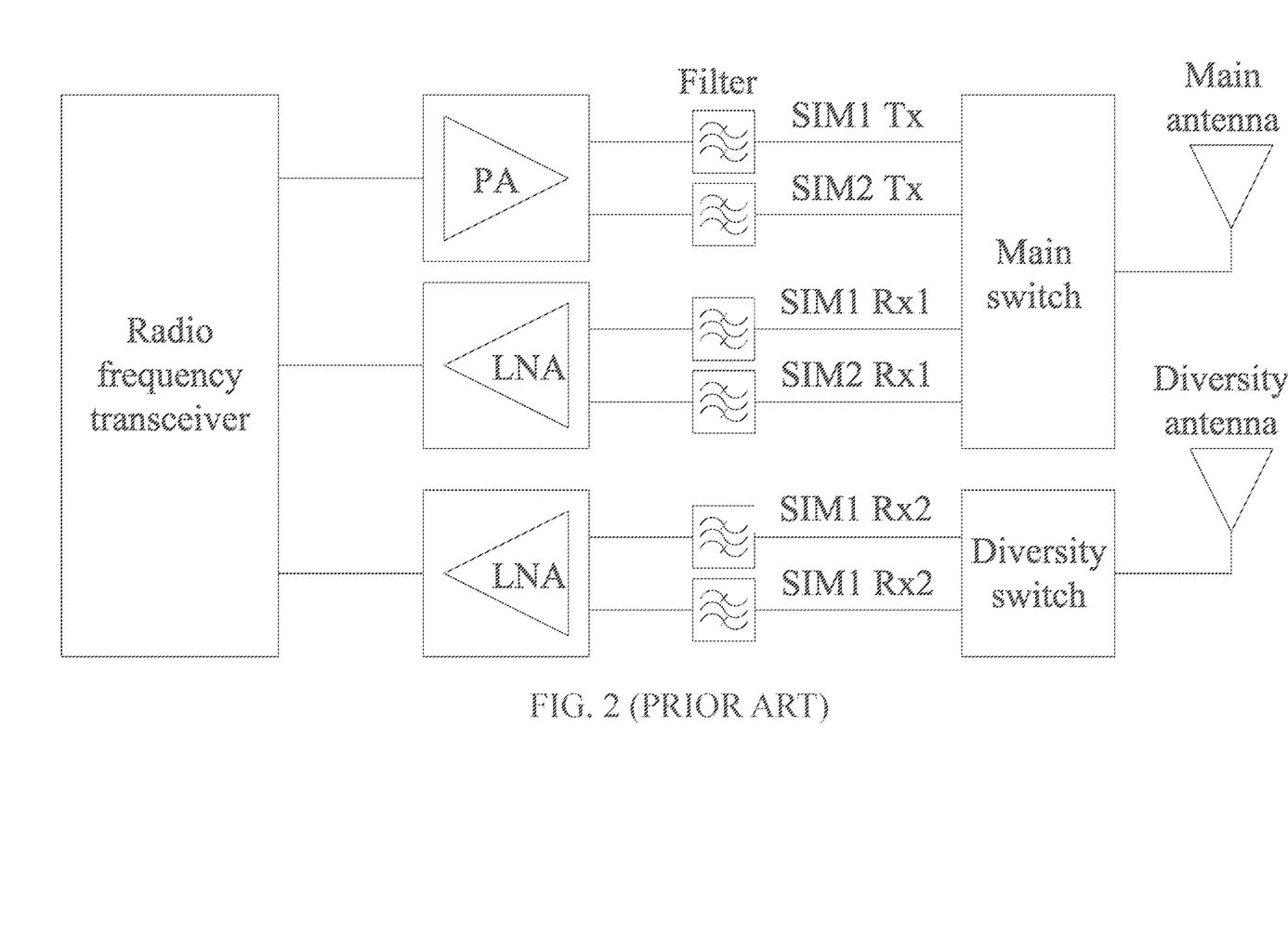
FIG. 2 is a schematic structural diagram of a radio frequency circuit corresponding to an existing virtual dual SIM dual active technology.

FIG. 2 shows a radio frequency circuit of a virtual dual SIM dual active technology. The circuit includes a Power Amplifier (PA), a Low Noise Amplifier (LNA), a radio frequency transceiver, a main switch, a diversity switch, a filter, a main antenna, and a diversity antenna. A first SIM card and a second SIM card communicate by using different TDD frequency bands, and the frequency bands corresponding to the first SIM card and the second SIM card share one PA. Transmission by the first SIM card, main receiving by the first SIM card, transmission by the second SIM card, and main receiving by the second SIM card are switched through a single-pole main switch, and diversity receiving by the first SIM card and diversity receiving by the second SIM card are switched through a single-pole diversity switch. On this basis, it may be learned that, at a same moment, only one of transmission by the first SIM card, main receiving by the first SIM card, transmission by the second SIM card, and main receiving by the second SIM card may occur. In addition, at a same moment, only either diversity receiving by the first SIM card or diversity receiving by the second SIM card may occur.

In the embodiments of this application, in the accompanying drawings, SIM1 represents the first SIM card, SIM2 represents the second SIM card, Tx represents transmission, and Rx represents reception. In the accompanying drawings, SIM1 Tx represents main transmission by the first SIM card, SIM2 Tx represents main transmission by the second SIM card. SIM1 Rx represents main receiving by the first SIM card, SIM2 Rx1 represents main receiving by the second SIM card, SIM1 Rx2 represents diversity receiving by the first SIM card, and SIM2 Rx2 represents diversity receiving by the second SIM car.

Figure 3:
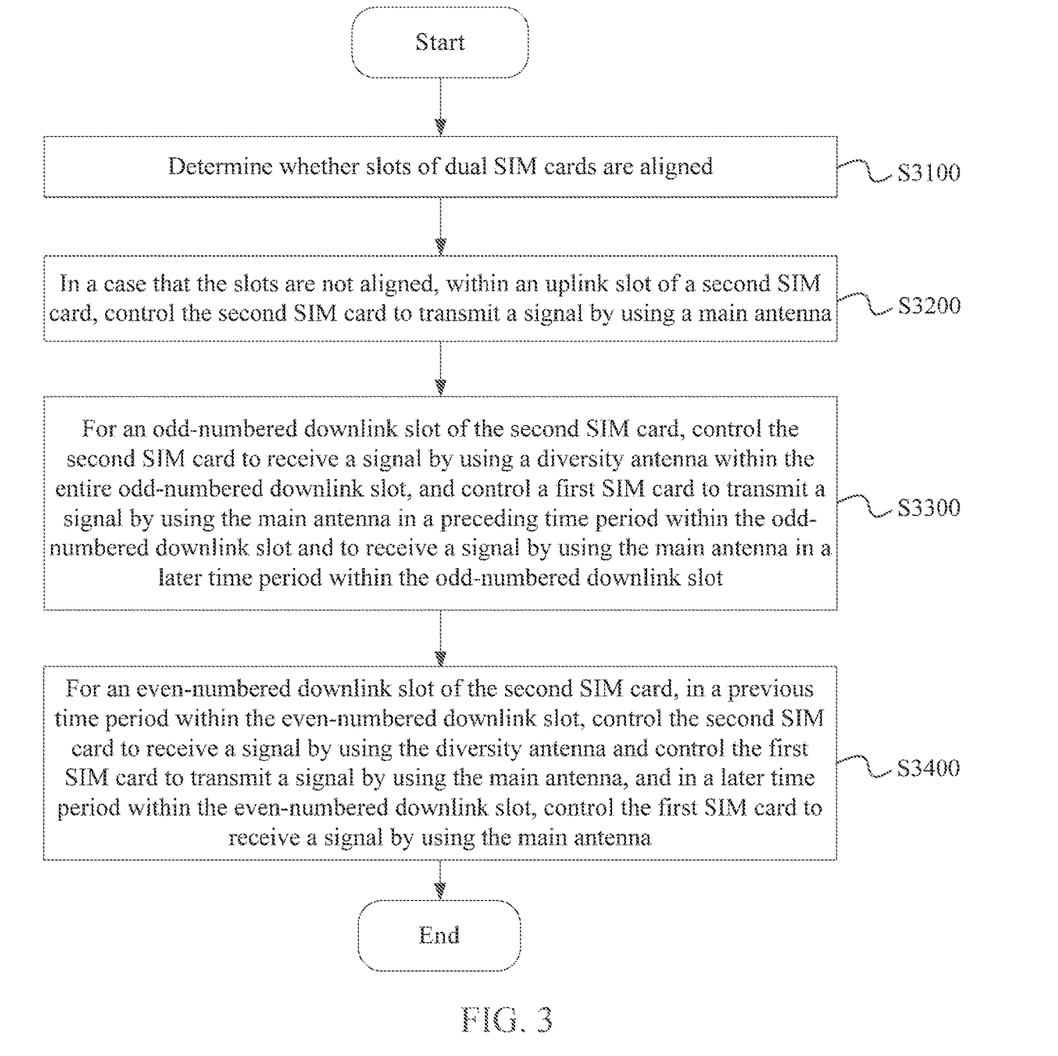
FIG. 3 is a schematic flowchart of a dual SIM communication method for a terminal according to an embodiment of this application.

As shown in FIG. 3, an embodiment of this application provides a dual SIM communication method for a terminal. The method is implemented based on the circuit shown in FIG. 2 and includes the following S3100 to S3400:

S3100. Determine whether slots of dual SIM cards are aligned.

In this embodiment of this application, one slot period may include an uplink slot and a downlink slot. An uplink slot and a downlink slot of a same SIM card do not overlap each other. The uplink slot or the downlink slot of the SIM card may include an idle time period, and the SIM card does not perform a transmit operation or a receive operation in the idle time period.

In this embodiment of this application, the dual SIM cards mentioned in this embodiment are separately denoted as a first SIM card and a second SIM card. The first SIM card and the second SIM card share a main antenna and a diversity antenna.

In an example, in a case that a start time of an uplink slot of the first SIM card is the same as a start time of an uplink slot of the second SIM card, an end time of the uplink slot of the first SIM card is the same as an end time of the uplink slot of the second SIM card, a start time of a downlink slot of the first SIM card is the same as a start time of a downlink slot of the second SIM card, and an end time of the downlink slot of the first SIM card is the same as an end time of the downlink slot of the second SIM card, it is determined that the slots of the dual SIM cards of the terminal are aligned; otherwise, it is determined that the slots of the dual SIM cards of the terminal are not aligned.

In this embodiment of this application, a standard of a SIM card is determined by a working band of the SIM card, and the standard of the SIM card specifies a communication slot of the SIM card. On this basis, it may be determined, based on a working band of the first SIM card and a working band of the second SIM card, whether the slots of the dual SIM cards are aligned.

In a case that the slots of the dual SIM cards are not aligned, the first SIM card and the second SIM card are controlled to communicate in a first manner. The performing communication in a first manner includes steps S3200 to S3400

S3200. Within an uplink slot of the second SIM card, control the second SIM card to transmit a signal by using the main antenna.

In this embodiment, in the uplink slot of the second SIM card, the second SIM card always transmits a signal by using the main antenna.

Based on the foregoing S3200, it may be learned that a signal may be transmitted in each slot period of the second SIM card, and no transmission interruption exists.

S3300. For an odd-numbered downlink slot of the second SIM card, control the second SIM card to receive a signal by using the diversity antenna within the entire odd-numbered downlink slot, and control the first SIM card to transmit a signal by using the main antenna in a preceding time period within the odd-numbered downlink slot and to receive a signal by using the main antenna in a later time period within the odd-numbered downlink slo.

In this embodiment, for the odd-numbered downlink slot of the second SIM card, a signal is received by using the diversity antenna within the entire odd-numbered downlink slot of the second SIM card. On this basis, the odd-numbered downlink slot of the second SIM card is divided into two time periods, which are the preceding time period within the odd-numbered downlink slot and the later time period within the odd-numbered downlink slot. The first SIM card is controlled to transmit a signal by using the main antenna in the preceding time period within the odd-numbered downlink slot of the second SIM card and to receive a signal by using the main antenna in the later time period within the odd-numbered downlink slot of the second SIM card.

It may be learned from the foregoing content that, the second SIM card may receive a signal within the odd-numbered downlink slot of the second SIM card. Further, the odd-numbered downlink slot of the second SIM card corresponds to a part of an even-numbered slot period of the first SIM card. On this basis, with reference to the foregoing S3300, it may be learned that the first SIM card may transmit a signal in the even-numbered slot period of the first SMI card, and no transmission interruption exists. In addition, the first SIM card may receive a signal in the even-numbered slot period of the first SIM card.

S3400 For an even-numbered downlink slot of the second SIM card, in a preceding time period within the even-numbered downlink slot, control the second SIM card to receive a signal by using the diversity antenna and control the first SIM card to transmit a signal by using the main antenna, and in a later time period within the even-numbered downlink slot, control the first SIM card to receive a signal by using the main antenn.

In this embodiment, the uplink slot of the second SIM card and a downlink slot of the second SIM card are alternate.

In this embodiment, the even-numbered downlink slot of the second SIM card is divided into two periods, which are respectively the preceding time period within the even-numbered downlink slot and the later time period within the even-numbered downlink slot. In the preceding time period within the even-numbered downlink slot, the second SIM card is controlled to receive a signal by using the diversity antenna. In this case, the main antenna is not occupied. On this basis, in the preceding time period within the even-numbered downlink slot, the first SIM card is controlled to transmit a signal by using the main antenna, and in the later time period within the even-numbered downlink slot, the first SIM card is controlled to receive a signal by using the main antenn.

It may be learned from the foregoing content that, the second SIM card may receive a signal within the even-numbered downlink slot of the second SIM card, Further, the even-numbered downlink slot of the second SIM card corresponds to a part of an odd-numbered slot period of the first SIM card. On this basis, with reference to the foregoing S3400, it may be learned that the first SIM card may transmit a signal in the odd-numbered slot period of the first SIM card, and no transmission interruption exists. In addition, the first SIM card may receive a signal in the odd-numbered slot period of the first SIM card.

That is, the first SIM card can transmit a signal and receive a signal in each slot period of the first SIM card, and the second SIM card can transmit a signal and receive a signal in each slot period of the second SIM card.

In this embodiment of this application, it is determined whether current slots of dual SIM cards of a terminal are aligned; and in a case that the slots of the dual SIM cards are not aligned, communication is performed in a first manner, where within an uplink slot of a second SIM card, the second SIM card is controlled to transmit a signal by using a main antenna; for an odd-numbered downlink slot of the second SIM card, the second SIM card is controlled to receive a signal by using a diversity antenna within the entire downlink slot, and a first SIM card is controlled to transmit a signal by using the main antenna in a preceding time period within the downlink slot and to receive a signal by using the main antenna in a later time period within the downlink slot; and for an even-numbered downlink slot of the second SIM card, in a preceding time period within the downlink slot, the second SIM card is controlled to receive a signal by using the diversity antenna and the first SIM card is controlled to transmit a signal by using the main antenna, and in a later time period within the downlink slot, the first SIM card is controlled to receive a signal by using the main antenna, where the uplink slot of the second SIM card and a downlink slot of the second SIM card are alternated. In this way, for either the first SIM card or the second SIM card, a signal may be transmitted in each slot period. This avoids transmission interruption between the first SIM card and the second SIM card, thereby greatly improving communication qualit.

Based on any one of the foregoing embodiments, the performing communication in a first manner may further include step S3500.

S3500. For the even-numbered downlink slot of the second SIM card, when the first SIM card receives a signal by using the main antenna, control the first SIM card to simultaneously receive a signal by using the diversity antenna.

In this embodiment, the first SIM card may receive a signal by using both the main antenna and the diversity antenna in a same time period. Based on this, a high-quality received signal can be obtained.

Correspondingly, the second SIM card is idle in the later time period within the even-numbered downlink slot of the second SIM card.

Based on any one of the foregoing embodiments, the performing communication in a first manner may further include step S3600.

S3600. Within the uplink slot of the second SIM card, control the first SIM card to receive a signal by using the diversity antenna in at least a preceding time period within the uplink slot.

In this embodiment, in the uplink slot of the second SIM card, the diversity antenna is not occupied. In this case, the first SIM card may be controlled to receive a signal by using the diversity antenna in at least the preceding time period within the uplink slot. In this way, duration of receiving a signal by the first SIM card can be prolonged.

Figure 4:
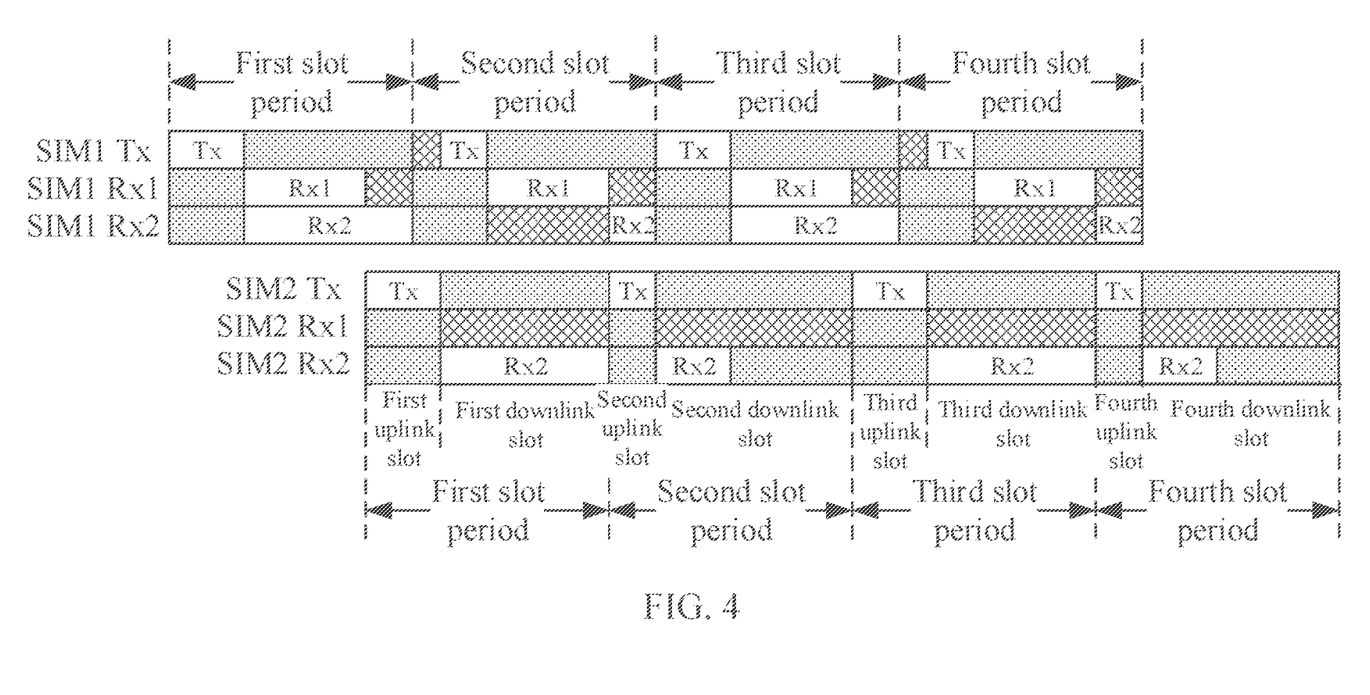
FIG. 4 is a first schematic diagram of a communication process of a dual SIM dual active technology according to an embodiment of this application.

Based on the foregoing embodiment shown in S3600, a dual SIM communication process may be shown in FIG. 4.

On the basis of any one of the foregoing embodiments, with reference to the communication process shown in FIG. 4, one of the first SIM card and the second SIM card of the terminal is in a signal receiving state, and the other of the first SIM card and the second SIM card is in a signal sending state, which may lead to a problem of transmission and reception interference. Especially, when the first SIM card and the second SIM card are in a same frequency, more serious transmission and reception interference may occur. In the case of serious transmission and reception interference, there is a risk of component damage in a radio frequency circuit. The dual SIM communication method for a terminal provided in this embodiment of this application further includes the following S3710 to S3740:

S3710. Obtain a transmit power of the terminal and a receive power of the terminal.

In this embodiment of this application, the transmit power of the terminal is a transmit power of a SIM card in a transmit state in the terminal, and the receive power of the terminal is a receive power of a SIM card in a receive state in the terminal.

It should be noted that implementation of the foregoing S3710 is: obtaining the transmit power of the terminal and the receive power of the terminal at a same moment.

S3720. Calculate a first difference between the transmit power and an antenna isolation threshold.

In this embodiment, the antenna isolation threshold is antenna isolation when a power of a signal transmitted by the main antenna does not greatly affect a signal received by the diversity antenna. A unit of the antenna isolation is dBm.

S3730. Calculate a second difference between the first difference and the receive power.

S3740. Adjust a communication state of the terminal based on the second difference.

In this embodiment of this application, steps S3710 to S3740 may be performed in a case that the slots of the dual SIM cards are not aligned.

In this embodiment of this application, the foregoing S3740 may be implemented by the following S3741 and S3742:

S3741. In a case that the second difference is greater than an upper limit of a preset range, adjust the terminal to enter a dual SIM dual standby mode.

In this embodiment, in a case that the second difference is greater than the upper limit of the preset range, it indicates that the transmit power of the terminal is far greater than the receive power of the terminal, that is, the terminal has a weak signal, and a SIM card in a transmit state strongly interferes with a SIM card in a receive state. In this case, the terminal is adjusted to be switched to the dual SIM dual standby mode. In this way, a case that one SIM card is in a receive state and the other SIM card is in a transmit state at a same moment is avoided, thereby avoiding transmission and reception interference.

It should be noted that in this embodiment, the preset range may be set based on an experimental simulation or engineering test result.

S3742 In a case that the second difference is within the preset range, perform at least one of reducing a modulation order of a SIM card in a receive state in the terminal and reducing a working bandwidth of a SIM card in a transmit state in the terminal.

In this embodiment, in a case that the second difference is within the preset range, it indicates that the transmit power and the receive power of the terminal are basically the same, that is, the terminal has a medium signal strength, and a SIM in a transmit state interferes with a SIM card in a receive state. In this case, at least one of reducing a modulation order of a SIM card in a receive state in the terminal and reducing a working bandwidth of a SIM card in a transmit state in the terminal is performed.

In this embodiment, under a same Signal Noise Ratio (SNR) requirement, if total noise of a narrower working bandwidth is lower, a power of a wanted signal is also lower. Therefore, when the SIM card in a transmit state interferes with the SIM card in a receive state, the working bandwidth of the SIM card in a transmit state may be reduced, to reduce the transmit power, thereby reducing interference to the SIM card in a receive state.

In this embodiment, a larger SNR is required for a higher order modulation scheme to meet a demodulation requirement. Therefore, when the SIM card in a transmit state interferes with the SIM card in a receive state, the modulation order of the SIM card in a receive state in the terminal may be reduced, to meet a receive SNR requirement. In this embodiment of this application, a modulation scheme of the SIM card in a receive state may be Quadrature Amplitude Modulation (QAM), and an adjustment rule may be that a modulation order of the quadrature amplitude modulation is reduced by one level. For example, if a current modulation scheme of the SIM card in a receive state is 256 QAM, the modulation scheme is reduced to 64 QAM. If the current modulation scheme of the SIM card in a receive state is 64 QAM, the modulation scheme is reduced to 16 QAM.

Corresponding to the foregoing S3741 and S3742, in a case that the second difference is less than the upper limit of the preset range, it indicates that the transmit power of the terminal is far less than the receive power of the terminal, that is, the terminal is in a strong signal scene, and the SIM in a transmit state does not interfere with the SIM card in a receive state. In this case, the foregoing S3710 is repeatedly performed.

On the basis of any one of the foregoing embodiments, the dual SIM communication method for a terminal provided in this embodiment of this application further includes: in a case that the slots of the dual SIM cards are aligned, performing communication in a second manner.

Figure 5:
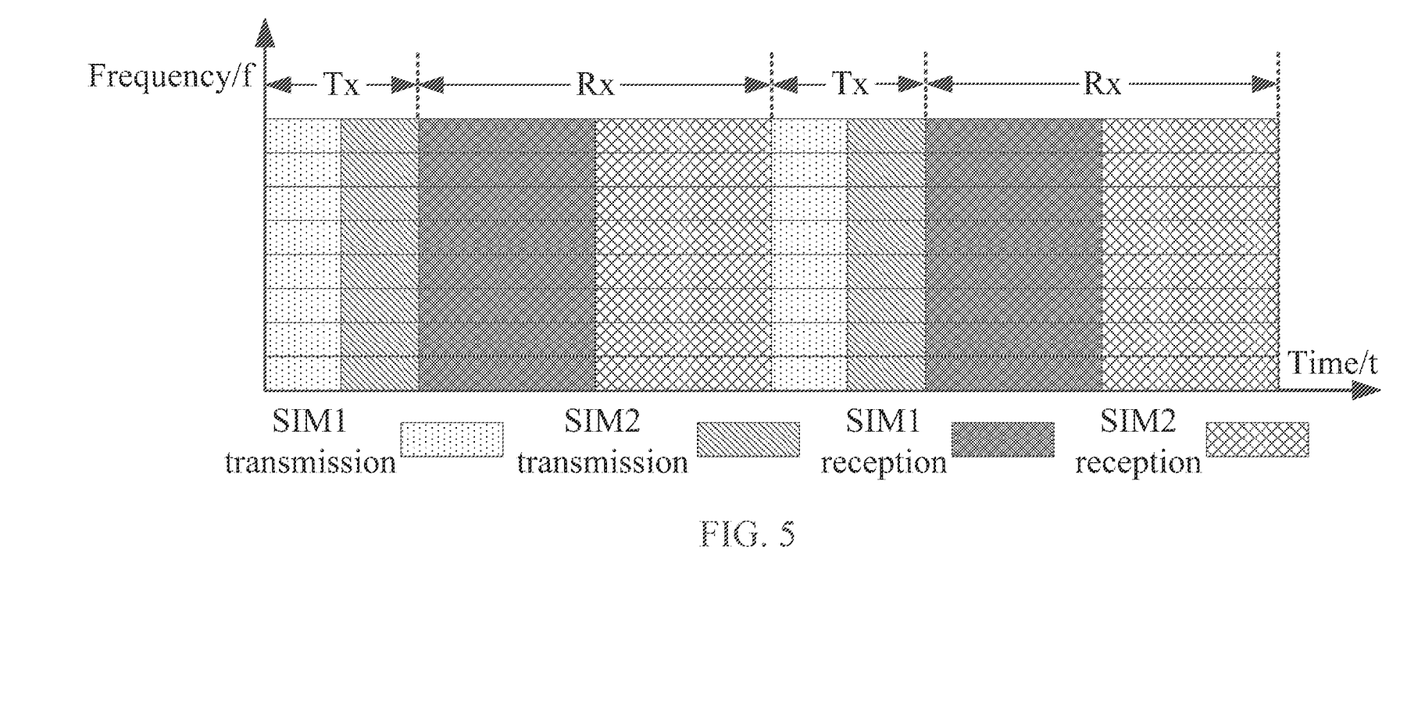
FIG. 5 is a second schematic diagram of a communication process of a dual SIM dual active technology according to an embodiment of this application.

The performing communication in a second manner may further include the following S3810 and S3820:

S3810 Within a transmit slot, control the first SIM card and the second SIM card to transmit a signal by using the main antenna in a time division manner.

S3820. Within a receive slot, control the first SIM card and the second SIM card to receive a signal by using the main antenna in a time division manner and control the first SIM card and the second SIM card to receive a signal by using the diversity antenna in a time division manner.

In this embodiment of this application, corresponding to the foregoing S3200, in a case that a slot of the first SIM card and a slot of the second SIM card are aligned, the entire slot is divided into two parts: a receive slot and a transmit slot, and the transmit slot is before the receive slot.

It should be noted that, in this embodiment, duration corresponding to the transmit slot and the receive slot may be set based on an actual requirement.

In this embodiment, based on the foregoing S3810 and S3820, a dual SIM communication process of the terminal may be shown in FIG. 5.

It may be learned from the foregoing content that, in the dual SIM communication method for a terminal provided in this embodiment of this application, in a case that the slots are aligned, the first SIM card and the second SIM card may perform sending and receiving in each slot through the foregoing S3810 and S3820. In addition, transmission and reception interference caused when the terminal transmits a signal by using a SIM card and receives a signal by using another SIM card at a same moment is avoided.

In addition, in this embodiment, in a case that the first SIM card and the second SIM card are in a same communication frequency band, a transmit path of the first SIM card and a transmit path of the second SIM card may share a same filter, that is, the transmit path of the first SIM card and the transmit path of the second SIM card are a same channel. On this basis, a main switch does not need to be switched. Therefore, in the dual SIM communication method for a terminal provided in this embodiment, switching of the main switch can be further reduced, thereby greatly reducing overheads of a radio frequency circuit.

On the basis of any one of the foregoing embodiments, the dual SIM communication method for a terminal provided in this embodiment of this application further includes: in a case that the slots of the dual SIM cards are aligned, performing communication in a third manner.

Figure 6:
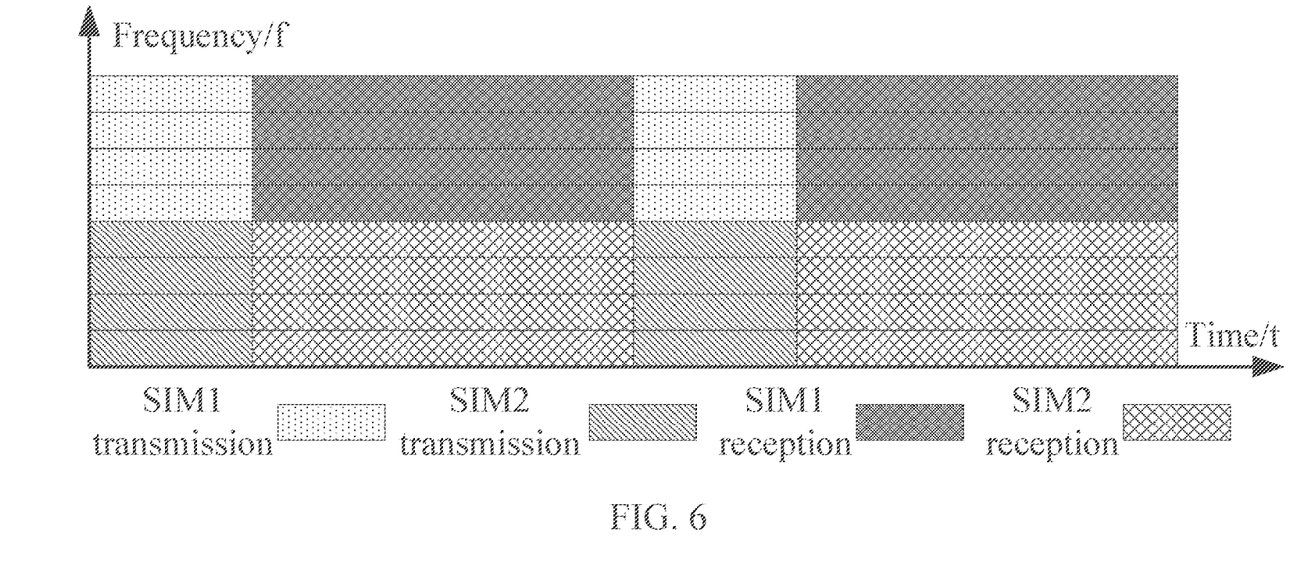
FIG. 6 is a third schematic diagram of a communication process of a dual SIM dual active technology according to an embodiment of this application.

The performing communication in a third manner may further include the following S3910 and S3920:

S3910 Within a transmit slot, control the first SIM card and the second SIM card to transmit a signal by using the main antenna in a frequency division manner.

S3920. Within a receive slot, control the first SIM card and the second SIM card to receive a signal by using the main antenna in a frequency division manner and control the first SIM card and the second SIM card to receive a signal by using the diversity antenna in a frequency division manner.

In this embodiment of this application, corresponding to the foregoing S3200, in a case that a slot of the first SIM card and a slot of the second SIM card are aligned, the entire slot is divided into two parts: a receive slot and a transmit slot, and the transmit slot is before the receive slo.

It should be noted that, in this embodiment, duration corresponding to the transmit slot and the receive slot may be set based on an actual requirement.

In this embodiment, based on the foregoing S3910 and S3920, a dual SIM communication process of the terminal may be shown in FIG. 6.

It may be learned from the foregoing content that, in the dual SIM communication method for a terminal provided in this embodiment of this application, in a case that the slots are aligned, the first SIM card and the second SIM card may perform sending and receiving in each slot through the foregoing S3910 and S3920.

In addition, in this embodiment, in a case that the first SIM card and the second SIM card are in different subbands in a same communication frequency band, for example, the first SIM card is in a Long Term Evolution (LTE) B41 of 2560 MHz to 2580 MHz, and the second SIM card is in an LTE B41 of 2600 MHz to 2620 MHz, a transmit path of the first SIM card and a transmit path of the second SIM card may share a same filter, that is, the transmit path of the first SIM card and the transmit path of the second SIM card are a same channel. On this basis, a main switch does not need to be switched. Therefore, in the dual SIM communication method for a terminal provided in this embodiment, switching of the main switch can be further reduced, thereby greatly reducing overheads of a radio frequency circuit.

The dual SIM communication method for a terminal provided in the embodiments of this application may be performed by a dual SIM communication apparatus for a terminal, or a control module that is in the dual SIM communication apparatus for a terminal and that is configured to perform and load the foregoing dual SIM communication method. In the embodiments of this application, an example in which the dual SIM communication apparatus for a terminal performs and loads the dual SIM communication method for a terminal is used to describe the dual SIM communication method for a terminal provided in the embodiments of this application.

Figure 7:
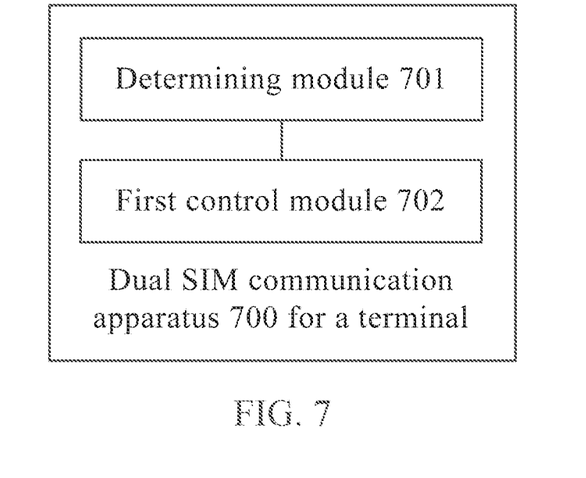
FIG. 7 shows a dual SIM communication apparatus for a terminal according to an embodiment of this application.

As shown in FIG. 7, an embodiment of this application provides a dual SIM communication apparatus 700 for a terminal, where dual SIM cards share a main antenna and a diversity antenna, the dual SIM cards include a first SIM card and a second SIM card, and the apparatus 700 includes a determining module 701 and a first control module 702.

The determining module 701 is configured to determine whether current slots of the dual SIM cards of the terminal are aligned.

The first control module 702 is configured to: in a case that the slots of the dual SIM cards are not aligned, control the first SIM card and the second SIM card to communicate in a first manner.

That the first control module 702 controls the first SIM card and the second SIM card to communicate in a first manner includes:
- within an uplink slot of the second SIM card, controlling the second SIM card to transmit a signal by using the main antenna;
- for an odd-numbered downlink slot of the second SIM card, controlling the second SIM card to receive a signal by using the diversity antenna within the entire odd-numbered downlink slot, and controlling the first SIM card to transmit a signal by using the main antenna in a preceding time period within the odd-numbered downlink slot and to receive a signal by using the main antenna in a later time period within the odd-numbered downlink slot; and
- for an even-numbered downlink slot of the second SIM card, in a preceding time period within the even-numbered downlink slot, controlling the second SIM card to receive a signal by using the diversity antenna and controlling the first SIM card to transmit a signal by using the main antenna, and in a later time period within the even-numbered downlink slot, controlling the first SIM card to receive a signal by using the main antenna, where the uplink slot of the second SIM card and a downlink slot of the second SIM card are alternated.

In an embodiment, that the first control module 702 controls the first SIM card and the second SIM card to communicate in a first manner further includes: for the even-numbered downlink slot of the second SIM card, when the first SIM card receives a signal by using the main antenna, controlling the first SIM card to simultaneously receive a signal by using the diversity antenna.

In an embodiment, that the first control module 702 controls the first SIM card and the second SIM card to communicate in a first manner further includes: within the uplink slot of the second SIM card, controlling the first SIM card to receive a signal by using the diversity antenna within at least a preceding time period within the uplink slot.

In an embodiment, the apparatus 700 further includes an obtaining module, a calculation module, and an adjustment module.

The obtaining module is configured to obtain a transmit power of the terminal and a receive power of the terminal.

The calculation module is configured to: calculate a first difference between the transmit power and an antenna isolation threshold, and calculate a second difference between the first difference and the receive power.

The adjustment module is configured to adjust a communication state of the terminal based on the second difference.

In an embodiment, the adjustment module includes a first adjustment submodule and/or a second adjustment submodule.

The first adjustment submodule is configured to: in a case that the second difference is greater than an upper limit of a preset range, adjust the terminal to enter a dual SIM dual standby mode.

The second adjustment submodule is configured to: in a case that the second difference is within the preset range, perform at least one of reducing a modulation order of a SIM card in a receive state in the terminal and reducing a working bandwidth of a SIM card in a transmit state in the terminal.

In an embodiment, the apparatus 700 further includes a second control module.

The second control module is configured to: in a case that the slots of the dual SIM cards are aligned, control the first SIM card and the second SIM card to communicate in a second manner.

That the second control module controls the first SIM card and the second SIM card to communicate in a second manner includes:
- within a transmit slot, controlling the first SIM card and the second SIM card to transmit a signal by using the main antenna in a time division manner; and
- within a receive slot, controlling the first SIM card and the second SIM card to receive a signal by using the main antenna in a time division manner and controlling the first SIM card and the second SIM card to receive a signal by using the diversity antenna in a time division manner.

In an embodiment, the apparatus 700 further includes a third control module.

The third control module is configured to: in a case that the slots of the dual SIM cards are aligned, control the first SIM card and the second SIM card to communicate in a third manner.

That the third control module controls the first SIM card and the second SIM card to communicate in a third manner includes:
- in a case that the slots of the dual SIM cards are aligned, within a transmit slot, controlling the first SIM card and the second SIM card to transmit a signal by using the main antenna in a frequency division manner; and
- within a receive slot, controlling the first SIM card and the second SIM card to receive a signal by using the main antenna in a frequency division manner and controlling the first SIM card and the second SIM card to receive a signal by using the diversity antenna in a frequency division manner.

The dual SIM communication apparatus for a terminal in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, an Ultra-Mobile Personal Computer (UMPC), a netbook, or a Personal Digital Assistant (PDA), and the non-mobile electronic device may be a server. This is not specifically limited in this embodiment of this application.

The dual SIM communication apparatus for a terminal in this embodiment of this application may be an apparatus with an operating system. The operating system may be an Android operating system, an iOS operating system, or another possible operating system. This is not specifically limited in the embodiments of this application.

The dual SIM communication apparatus for a terminal provided in this embodiment of this application can implement the processes implemented in the dual SIM communication apparatus for a terminal in the method embodiment in FIG. 3. To avoid repetition, details are not described herein again.

In this embodiment of this application, a determining module is configured to determine whether current slots of dual SIM cards of a terminal are aligned; and a first control module is configured to: in a case that the slots of the dual SIM cards are not aligned, within an uplink slot of a second SIM card, control the second SIM card to transmit a signal by using a main antenna; for an odd-numbered downlink slot of the second SIM card, control the second SIM card to receive a signal by using a diversity antenna within the entire downlink slot, and control a first SIM card to transmit a signal by using the main antenna in a preceding time period within the downlink slot and to receive a signal by using the main antenna in a later time period within the downlink slot; and for an even-numbered downlink slot of the second SIM card, in a preceding time period within the downlink slot, control the second SIM card to receive a signal by using the diversity antenna and control the first SIM card to transmit a signal by using the main antenna, and in a later time period within the downlink slot, control the first SIM card to receive a signal by using the main antenna, where the uplink slot of the second SIM card and a downlink slot of the second SIM card are alternated. In this way, for either the first SIM card or the second SIM card, a signal may be transmitted in each slot period. This avoids transmission interruption between the first SIM card and the second SIM card, thereby greatly improving communication quality.

Figure 8:
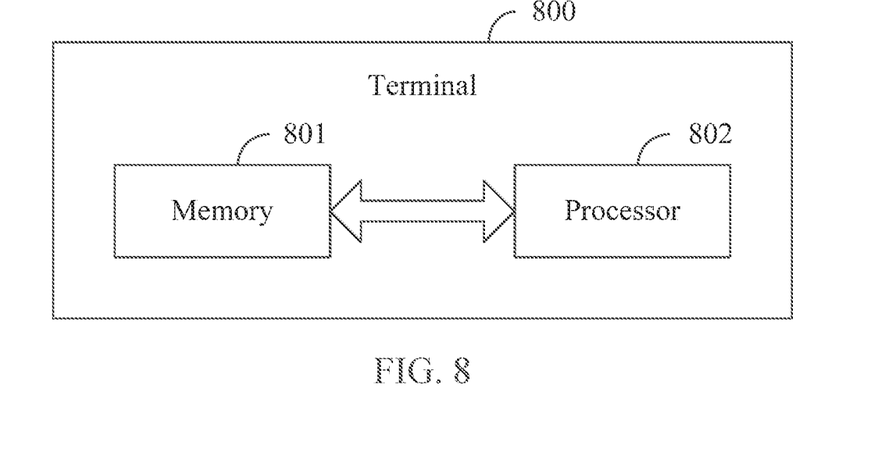
FIG. 8 is a schematic structural diagram of a terminal according to an embodiment of this application.

For example, an embodiment of this application further provides a terminal 800. As shown in FIG. 8, the terminal 800 includes dual SIM cards, where the dual SIM cards share a main antenna and a diversity antenna, and the dual SIM cards include a first SIM card and a second SIM card. The terminal 800 further includes a processor 810, a memory 809, and a program or an instruction that is stored in the memory 809 and that can run on the processor 810, where when the program or the instruction is executed by the processor 810, the processes of the foregoing dual SIM communication method for a terminal are implemented and a same technical effect can be achieved. To avoid repetition, details are not described herein again.

The electronic device in this embodiment of this application may be a mobile electronic device or a non-mobile electronic device.

Figure 9:
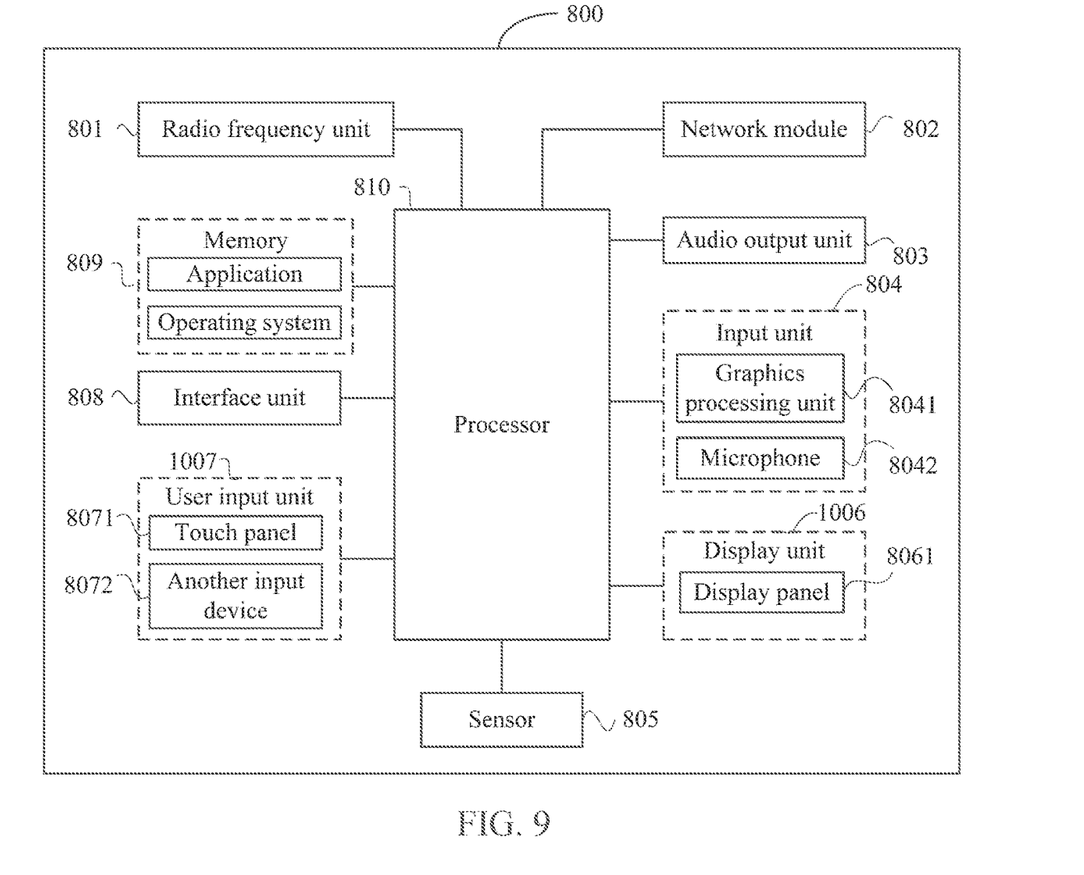
FIG. 9 is a schematic diagram of a hardware structure of a terminal according to an embodiment of this application.

FIG. 9 is a schematic diagram of a hardware structure of a terminal according to an embodiment of this application.

A terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the terminal 800 may further include a power supply (such as a battery) that supplies power to each component. The power supply may be logically connected to the processor 810 by using a power supply management system, to implement functions such as charging and discharging management, and power consumption management by using the power supply management system. The terminal structure shown in FIG. 9 constitutes no limitation on the terminal, and the terminal may include more or fewer components than those shown in the figure, or combine some components, or have different component arrangements. Details are not described herein.

The processor 810 is configured to determine whether current slots of the dual SIM cards of the terminal are aligned; and in a case that the slots of the dual SIM cards are not aligned, control the first SIM card and the second SIM card to communicate in a first manner, where the controlling the first SIM card and the second SIM card to communicate in a first manner includes: within an uplink slot of the second SIM card, controlling the second SIM card to transmit a signal by using the main antenna; for an odd-numbered downlink slot of the second SIM card, controlling the second SIM card to receive a signal by using the diversity antenna within the entire odd-numbered downlink slot, and controlling the first SIM card to transmit a signal by using the main antenna in a preceding time period within the odd-numbered downlink slot and to receive a signal by using the main antenna in a later time period within the odd-numbered downlink slot; and for an even-numbered downlink slot of the second SIM card, in a preceding time period within the even-numbered downlink slot, controlling the second SIM card to receive a signal by using the diversity antenna and controlling the first SIM card to transmit a signal by using the main antenna, and in a later time period within the even-numbered downlink slot, controlling the first SIM card to receive a signal by using the main antenna, where the uplink slot of the second SIM card and a downlink slot of the second SIM card are alternated.

In this embodiment of the application, a processor determines whether current slots of dual SIM cards of a terminal are aligned; and in a case that the slots of the dual SIM cards are not aligned, within an uplink slot of a second SIM card, controls the second SIM card to transmit a signal by using a main antenna; for an odd-numbered downlink slot of the second SIM card, controls the second SIM card to receive a signal by using a diversity antenna within the entire odd-numbered downlink slot, and controls a first SIM card to transmit a signal by using the main antenna in a preceding time period within the downlink slot and to receive a signal by using the main antenna in a later time period within the odd-numbered downlink slot; and for an even-numbered downlink slot of the second SIM card, in a preceding time period within the even-numbered downlink slot, controls the second SIM card to receive a signal by using the diversity antenna and controls the first SIM card to transmit a signal by using the main antenna, and in a later time period within the even-numbered downlink slot, controls the first SIM card to receive a signal by using the main antenna, where the uplink slot of the second SIM card and a downlink slot of the second SIM card are alternated. In this way, for either the first SIM card or the second SIM card, a signal may be transmitted in each slot period. This avoids transmission interruption between the first SIM card and the second SIM card, thereby greatly improving communication quality.

An embodiment of this application further provides a readable storage medium. The readable storage medium stores a program or an instruction, and when the program or the instruction is executed by a processor, the processes of the foregoing embodiment of the dual SIM communication method for a terminal are implemented and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing embodiment of the dual SIM communication method for a terminal and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, the technical solutions of this application entirely or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, or a server) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A dual Subscriber Identity Module (SIM) communication method for a terminal, wherein dual SIM cards share a main antenna and a diversity antenna, the dual SIM cards comprise a first SIM card and a second SIM card, and the method comprises:
   determining whether slots of the dual SIM cards are aligned; and
   when the slots of the dual SIM cards are not aligned, controlling the first SIM card and the second SIM card to communicate in a first manner, wherein
   the controlling the first SIM card and the second SIM card to communicate in a first manner comprises:
   within an uplink slot of the second SIM card, controlling the second SIM card to transmit a signal by using the main antenna;
   for an odd-numbered downlink slot of the second SIM card, controlling the second SIM card to receive a signal by using the diversity antenna within the entire odd-numbered downlink slot, and controlling the first SIM card to transmit a signal by using the main antenna in a preceding time period within the odd-numbered downlink slot and to receive a signal by using the main antenna in a later time period within the odd-numbered downlink slot; and
   for an even-numbered downlink slot of the second SIM card, in a preceding time period within the even-numbered downlink slot, controlling the second SIM card to receive a signal by using the diversity antenna and controlling the first SIM card to transmit a signal by using the main antenna, and in a later time period within the even-numbered downlink slot, controlling the first SIM card to receive a signal by using the main antenna, wherein
   the uplink slot of the second SIM card and a downlink slot of the second SIM card are alternated.

2. The dual SIM communication method according to claim 1, wherein the controlling the first SIM card and the second SIM card to communicate in a first manner further comprises:
   for the even-numbered downlink slot of the second SIM card, when the first SIM card receives a signal by using the main antenna, controlling the first SIM card to simultaneously receive a signal by using the diversity antenna.

3. The dual SIM communication method according to claim 1, wherein the controlling the first SIM card and the second SIM card to communicate in a first manner further comprises:
   within the uplink slot of the second SIM card, controlling the first SIM card to receive a signal by using the diversity antenna within at least a preceding time period within the uplink slot.

4. The dual SIM communication method according to claim 1, further comprising:
   obtaining a transmit power of the terminal and a receive power of the terminal,
   calculating a first difference between the transmit power and an antenna isolation threshold;
   calculating a second difference between the first difference and the receive power; and
   adjusting a communication state of the terminal based on the second difference.

5. The dual SIM communication method according to claim 4, wherein the adjusting a communication state of the terminal based on the second difference comprises:
   when the second difference is greater than an upper limit of a preset range, adjusting the terminal to enter a dual SIM dual standby mode; and
   when the second difference is within the preset range, performing at least one of reducing a modulation order of a SIM card in a receive state in the terminal and reducing a working bandwidth of a SIM card in a transmit state in the terminal.

6. The dual SIM communication method according to claim 1, further comprising: when the slots of the dual SIM cards are aligned, controlling the first SIM card and the second SIM card to communicate in a second manner, wherein
   the controlling the first SIM card and the second SIM card to communicate in a second manner comprises:
   within a transmit slot, controlling the first SIM card and the second SIM card to transmit a signal by using the main antenna in a time division manner; and
   within a receive slot, controlling the first SIM card and the second SIM card to receive a signal by using the main antenna in a time division manner and controlling the first SIM card and the second SIM card to receive a signal by using the diversity antenna in a time division manner.

7. The dual SIM communication method according to claim 1, further comprising: when the slots of the dual SIM cards are aligned, controlling the first SIM card and the second SIM card to communicate in a third manner, wherein
the controlling the first SIM card and the second SIM card to communicate in a third manner comprises:
within a transmit slot, controlling the first SIM card and the second SIM card to transmit a signal by using the main antenna in a frequency division manner; and
within a receive slot, controlling the first SIM card and the second SIM card to receive a signal by using the main antenna in a frequency division manner and controlling the first SIM card and the second SIM card to receive a signal by using the diversity antenna in a frequency division manner.

8. A terminal, comprising:
dual Subscriber Identity Module (SIM) cards, wherein the dual SIM cards share a main antenna and a diversity antenna, and the dual SIM cards comprise a first SIM card and a second SIM card;
a processor; and
a memory having a computer program or an instruction stored thereon, wherein the computer program or the instruction, when executed by the processor, causes the processor to perform a dual SIM communication method for the terminal, comprising:
determining whether slots of the dual SIM cards are aligned; and
when the slots of the dual SIM cards are not aligned, controlling the first SIM card and the second SIM card to communicate in a first manner, wherein
the controlling the first SIM card and the second SIM card to communicate in a first manner comprises:
within an uplink slot of the second SIM card, controlling the second SIM card to transmit a signal by using the main antenna;
for an odd-numbered downlink slot of the second SIM card, controlling the second SIM card to receive a signal by using the diversity antenna within the entire odd-numbered downlink slot, and controlling the first SIM card to transmit a signal by using the main antenna in a preceding time period within the odd-numbered downlink slot and to receive a signal by using the main antenna in a later time period within the odd-numbered downlink slot; and
for an even-numbered downlink slot of the second SIM card, in a preceding time period within the even-numbered downlink slot, controlling the second SIM card to receive a signal by using the diversity antenna and controlling the first SIM card to transmit a signal by using the main antenna, and in a later time period within the even-numbered downlink slot, controlling the first SIM card to receive a signal by using the main antenna, wherein
the uplink slot of the second SIM card and a downlink slot of the second SIM card are alternated.

9. The terminal according to claim 8, wherein the controlling the first SIM card and the second SIM card to communicate in a first manner further comprises:
for the even-numbered downlink slot of the second SIM card, when the first SIM card receives a signal by using the main antenna, controlling the first SIM card to simultaneously receive a signal by using the diversity antenna.

10. The terminal according to claim 8, wherein the controlling the first SIM card and the second SIM card to communicate in a first manner further comprises:
within the uplink slot of the second SIM card, controlling the first SIM card to receive a signal by using the diversity antenna within at least a preceding time period within the uplink slot.

11. The terminal according to claim 8, wherein the method further comprises:
obtaining a transmit power of the terminal and a receive power of the terminal;
calculating a first difference between the transmit power and an antenna isolation threshold;
calculating a second difference between the first difference and the receive power; and
adjusting a communication state of the terminal based on the second difference.

12. The terminal according to claim 11, wherein the adjusting a communication state of the terminal based on the second difference comprises:
when the second difference is greater than an upper limit of a preset range, adjusting the terminal to enter a dual SIM dual standby mode; and
when the second difference is within the preset range, performing at least one of reducing a modulation order of a SIM card in a receive state in the terminal and reducing a working bandwidth of a SIM card in a transmit state in the terminal.

13. The terminal according to claim 8, wherein the method further comprises: when the slots of the dual SIM cards are aligned, controlling the first SIM card and the second SIM card to communicate in a second manner, wherein
the controlling the first SIM card and the second SIM card to communicate in a second manner comprises:
within a transmit slot, controlling the first SIM card and the second SIM card to transmit a signal by using the main antenna in a time division manner; and
within a receive slot, controlling the first SIM card and the second SIM card to receive a signal by using the main antenna in a time division manner and controlling the first SIM card and the second SIM card to receive a signal by using the diversity antenna in a time division manner.

14. The terminal according to claim 8, wherein the method further comprises: when the slots of the dual SIM cards are aligned, controlling the first SIM card and the second SIM card to communicate in a third manner, wherein
the controlling the first SIM card and the second SIM card to communicate in a third manner comprises:
within a transmit slot, controlling the first SIM card and the second SIM card to transmit a signal by using the main antenna in a frequency division manner; and
within a receive slot, controlling the first SIM card and the second SIM card to receive a signal by using the main antenna in a frequency division manner and controlling the first SIM card and the second SIM card to receive a signal by using the diversity antenna in a frequency division manner.

15. A non-transitory computer-readable storage medium, storing instructions that, when executed by a processor, cause the processor to perform a dual Subscriber Identity Module (SIM) communication method for a terminal, comprising:
determining whether slots of the dual SIM cards are aligned; and
when the slots of the dual SIM cards are not aligned, controlling a first SIM card and a second SIM card to communicate in a first manner, wherein
the controlling the first SIM card and the second SIM card to communicate in a first manner comprises:

within an uplink slot of the second SIM card, controlling the second SIM card to transmit a signal by using a main antenna;
for an odd-numbered downlink slot of the second SIM card, controlling the second SIM card to receive a signal by using a diversity antenna within the entire odd-numbered downlink slot, and controlling the first SIM card to transmit a signal by using the main antenna in a preceding time period within the odd-numbered downlink slot and to receive a signal by using the main antenna in a later time period within the odd-numbered downlink slot; and
for an even-numbered downlink slot of the second SIM card, in a preceding time period within the even-numbered downlink slot, controlling the second SIM card to receive a signal by using the diversity antenna and controlling the first SIM card to transmit a signal by using the main antenna, and in a later time period within the even-numbered downlink slot, controlling the first SIM card to receive a signal by using the main antenna, wherein
the uplink slot of the second SIM card and a downlink slot of the second SIM card are alternated.

16. The non-transitory computer-readable storage medium according to claim 15, wherein the controlling the first SIM card and the second SIM card to communicate in a first manner further comprises:
for the even-numbered downlink slot of the second SIM card, when the first SIM card receives a signal by using the main antenna, controlling the first SIM card to simultaneously receive a signal by using the diversity antenna.

17. The non-transitory computer-readable storage medium according to claim 15, wherein the controlling the first SIM card and the second SIM card to communicate in a first manner further comprises:
within the uplink slot of the second SIM card, controlling the first SIM card to receive a signal by using the diversity antenna within at least a preceding time period within the uplink slot.

18. The non-transitory computer-readable storage medium according to claim 15, wherein the method further comprises:
obtaining a transmit power of the terminal and a receive power of the terminal;
calculating a first difference between the transmit power and an antenna isolation threshold;
calculating a second difference between the first difference and the receive power; and
adjusting a communication state of the terminal based on the second difference.

19. The non-transitory computer-readable storage medium according to claim 18, wherein the adjusting a communication state of the terminal based on the second difference comprises:
when the second difference is greater than an upper limit of a preset range, adjusting the terminal to enter a dual SIM dual standby mode; and
when the second difference is within the preset range, performing at least one of reducing a modulation order of a SIM card in a receive state in the terminal and reducing a working bandwidth of a SIM card in a transmit state in the terminal.

20. The non-transitory computer-readable storage medium according to claim 15, wherein the method further comprises: when the slots of the dual SIM cards are aligned, controlling the first SIM card and the second SIM card to communicate in a second manner, wherein
the controlling the first SIM card and the second SIM card to communicate in a second manner comprises:
within a transmit slot, controlling the first SIM card and the second SIM card to transmit a signal by using the main antenna in a time division manner, and
within a receive slot, controlling the first SIM card and the second SIM card to receive a signal by using the main antenna in a time division manner and controlling the first SIM card and the second SIM card to receive a signal by using the diversity antenna in a time division manner.

* * * * *